INVENTOR.
YVAN A. COUILLAIS
BY
Horton, Davis, Brewer & Brugman
ATTORNEYS

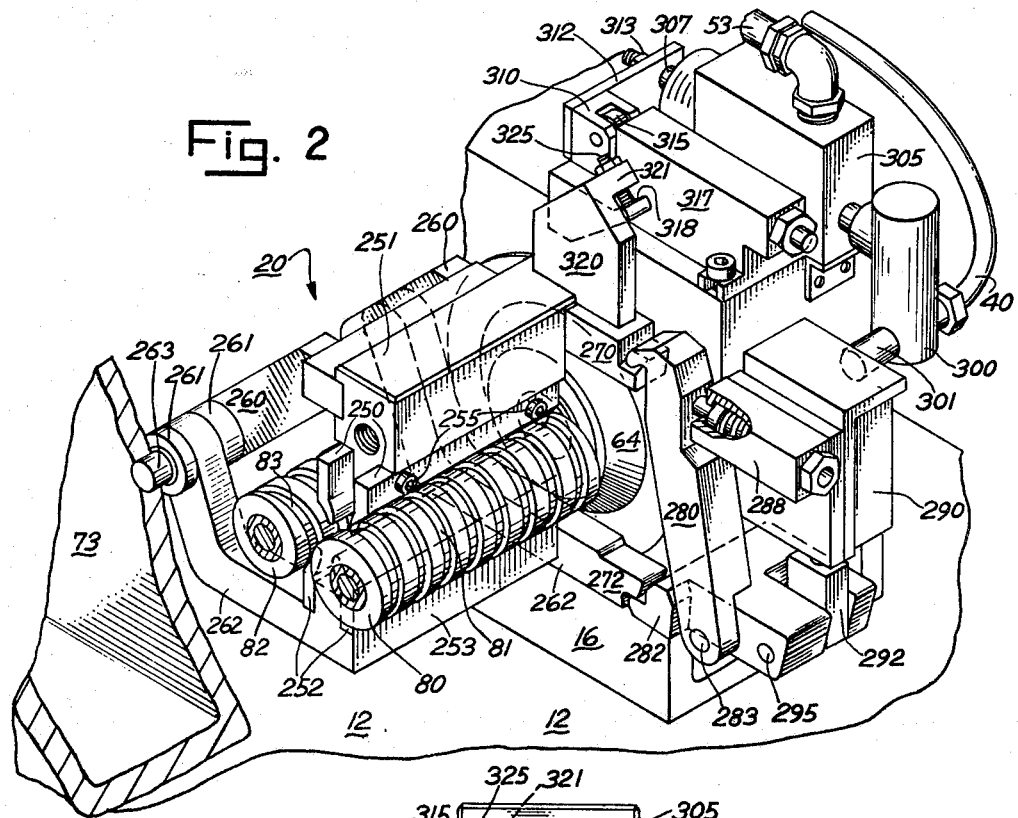

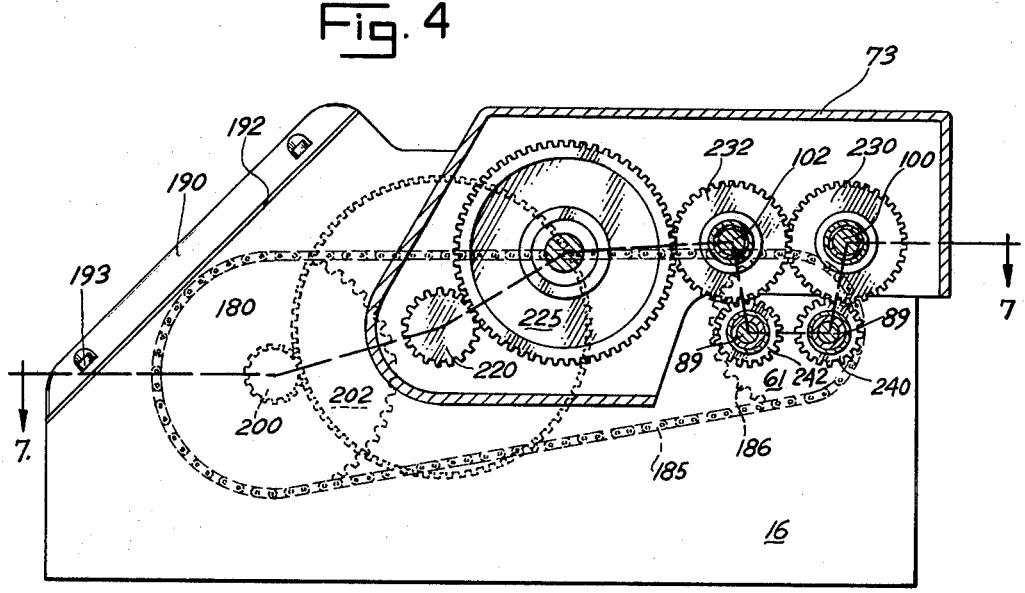
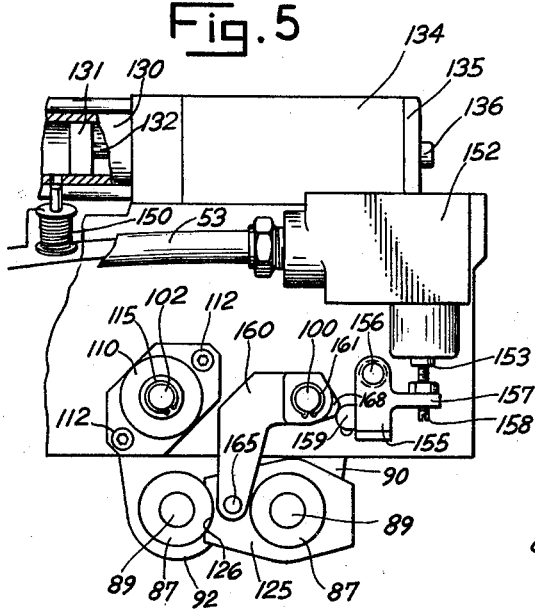
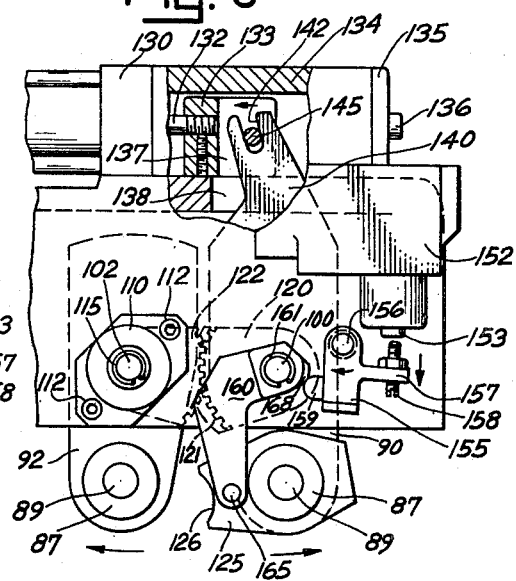

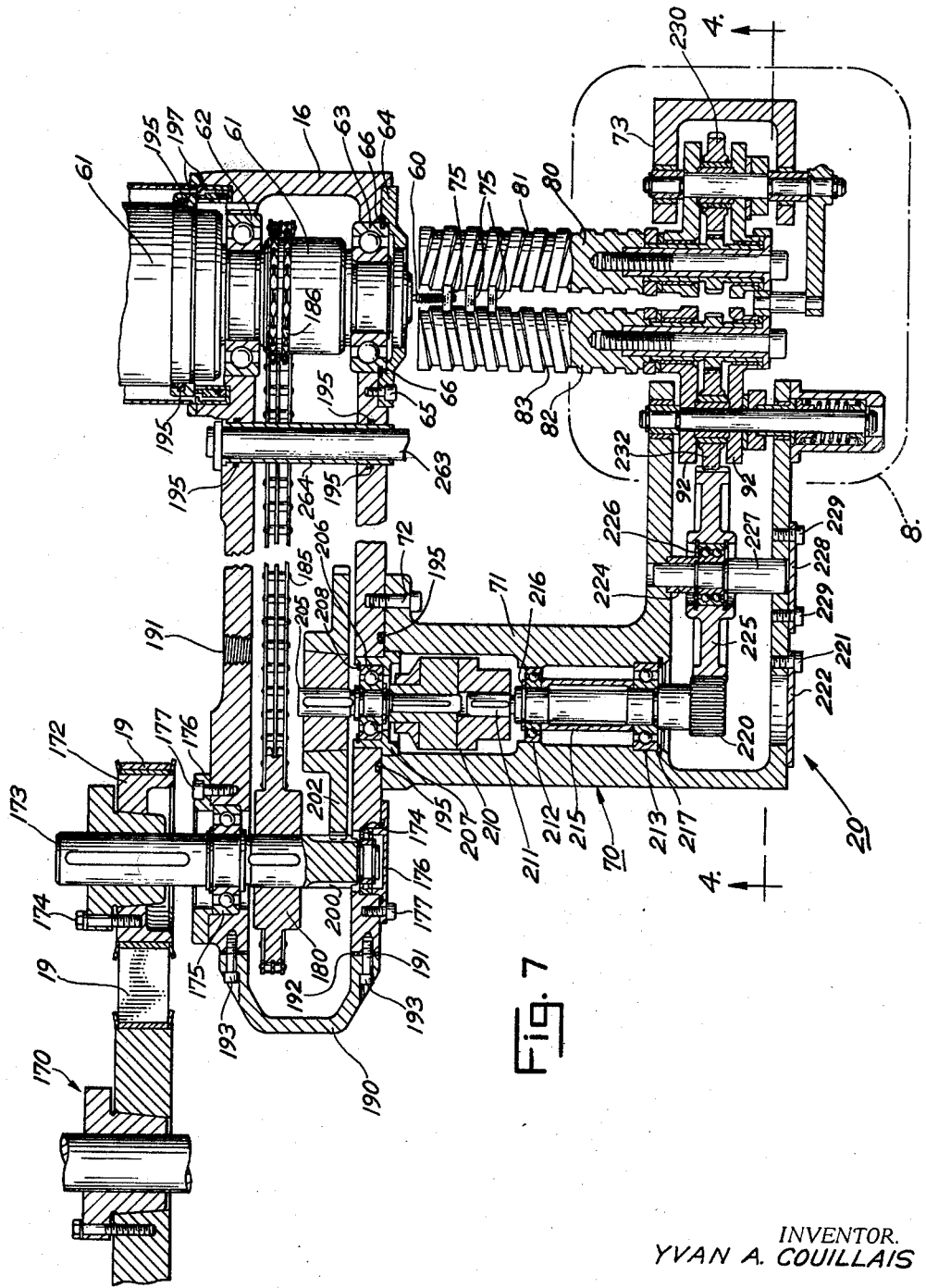

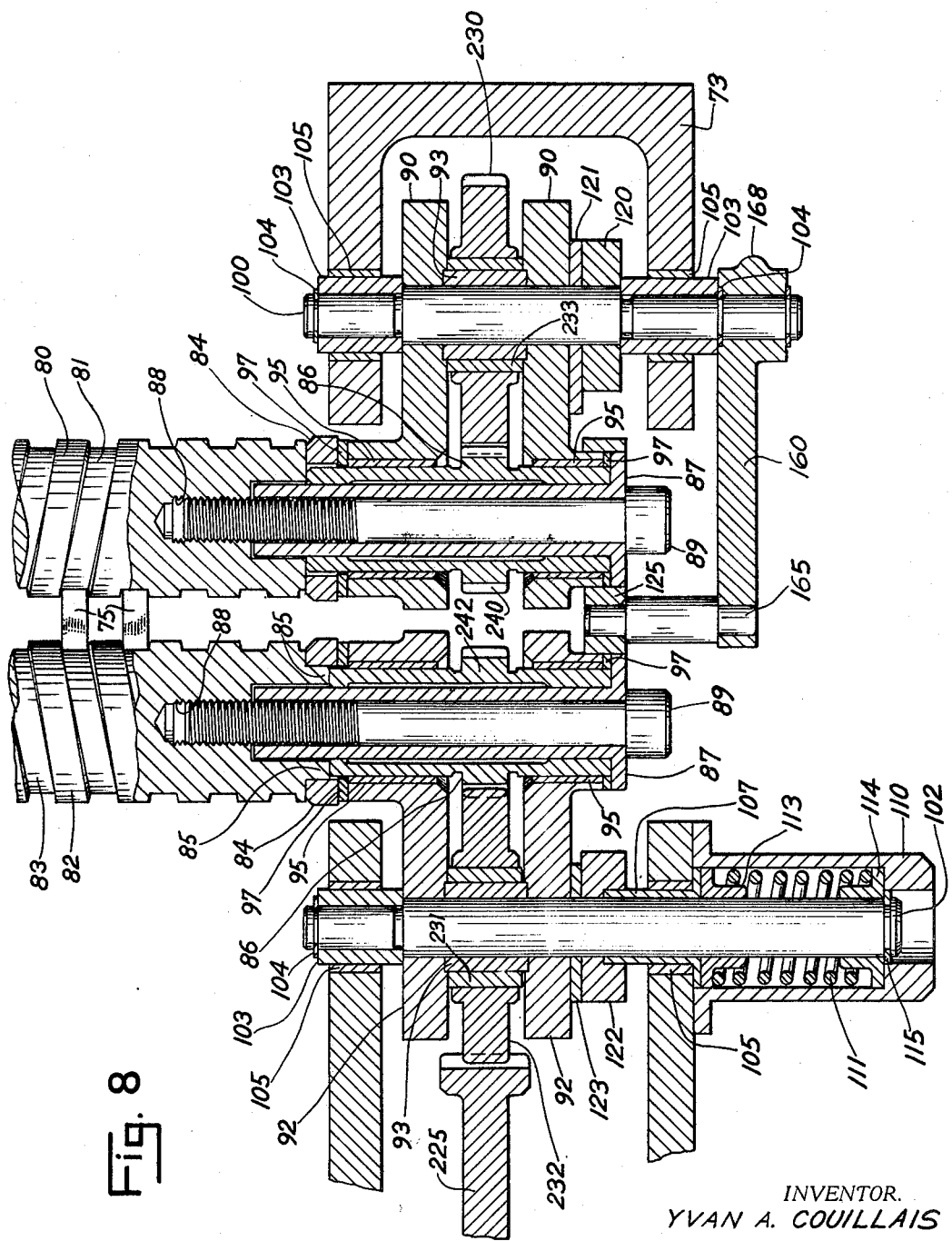

United States Patent Office 3,492,682
Patented Feb. 3, 1970

3,492,682
ROLLER DRIVE AND GUIDE RAIL FEED MECHANISM
Yvan A. Couillais, Livonia, Mich., assignor to MacLean-Fogg Lock Nut Co., Mundelein, Ill., a corporation of Delaware
Filed Aug. 16, 1967, Ser. No. 660,996
Int. Cl. B23g 11/00
U.S. Cl. 10—139                    27 Claims

ABSTRACT OF THE DISCLOSURE

A tapping machine feed mechanism having a pair of opposed and spaced helical drive rollers, in conjunction with a pair of opposed guide rail trackways positioned therealong to hold workpieces against the rollers. Releasable mountings for the rollers and rail trackways are held in place pneumatically to allow, by compression thereof, slight play as a predetermined pressure of the workpieces against the rollers and rail trackways is approached. Trip mechanisms sense the play at limits thereof, to release the rollers and rail trackways. The predetermined pressure and limit of play may be set, respectively, by adjustment of pneumatic holding pressure and by adjustment of variable contacts of the trip mechanisms. The feed mechanism and tap are driven by a gear train so that movement of workpieces along both is synchronous. The rollers remain in drive engagement, although released outwardly from the workpieces and tap.

BACKGROUND OF THE INVENTION

This invention relates generally to a tapping machine feed mechanism, and more particularly, to a feed mechanism utilizing helical roller drive in conjunction with guide rails and safety releases therefor.

In the past, it had been almost universal to feed work piece blanks by a plunger which forced each workpiece on to the tap. No attempt was made to accomplish what is generally known as "lead screw tapping." That is, there was no attempt made to feed the workpieces on to the tap at a speed of linear movement substantially synchronized with that effected by the action of the tap. The result was that the prior art threads were not uniform, since there was a spreading or distortion of the threads in the workpiece caused by forcing the workpieces on the tap at the beginning of the threading operation. The non-uniformity of threads, of course, is objectionable since the holding power is appreciably diminished.

A synchronized feed for "lead screw tapping" was first accomplished, in a practical manner, by the helical drive roller feed mechanism disclosed in Patent No. 3,233,259, issued Feb. 8, 1966, to J. A. MacLean III, et al. Earlier helical drive rollers were known; that is, Patent No. 1,557,715, issued Oct. 20, 1925, to P. H. McCain and Patent No. 1,806,707, issued on May 26, 1931, to P. C. Raymond. However, neither of these was concerned with a synchronized feed for "lead screw tapping."

The operation of all prior art helical drive rollers required a regular, equilateral shaped workpiece, since the rollers were symmetrically spaced thereabout. That is, to be able to simultaneously feed the workpiece along the tap and yet prevent its rotation therewith, usually required three or more drive rollers symmetrically spaced about the workpiece and tap. No provision was made for irregular or oblong shaped workpieces. For example, the "pierce nut" is an oblong rectangular nut utilized in the automobile industry by punching it into sheet metal interiors of automobile bodies. A symmetric spacing of three or more drive rollers about the "pierce nut" proved to be awkward, inadequate and unworkable. Furthermore, the provision of more than two helical drive rollers is expensive and also multiplies the problem of synchronizing the helical rollers in proper relation to each other.

SUMMARY OF THE INVENTION

Therefore, to overcome the foregoing and other difficulties of the prior art, the general object of this invention is to provide a new and improved mechanism for feeding workpieces of either equilateral or elongated shapes to a tapping machine. To this end, the present invention features the utilization of two opposed helical drive rollers in conjunction with a pair of opposed guide rail trackways positioned between the rollers to feed and guide the workpieces during movements to and along the tap. The rollers and rails are releasably mounted, allowing them to swing radially outward from the tap and workpieces. During the feeding operation, the roller sand rails are pneumatically held in place. Pneumatic compressibility allows a slight radial outward play of the rollers and rails. The rollers also have a slight axial play, spring biased toward the tap. Separate trip mechanisms are provided to sense outward limits of play, and thereby release the rollers and rails upon a predetermined pressure of the workpieces thereagainst. That is, an abnormal size or shape of a workpiece, or a dull or broken tap will cause excessive pressure against the rollers and rails, which is relieved by safety release. The roller's axial play is also sensed by a trip mechanism to provide for axial pressure components.

The predetermined pressure is determined by pneumatic holding pressure, which may be chosen by an appropriate setting of a pneumatic pressure regulator. The trip mechanisms include adjustable contacts to set the limits of play. In this manner, it is possible to set the safety release for various predetermined pressures and also to vary the sensitivity of the safety release by adjustment of the trip mechanism contacts.

A gear train drives the tap and rollers at speeds synchronized for "lead screw tapping." Intermeshed drive gears concentric on the axes about which the rollers swing apart, respectively, drive each other, and also roller gears on each roller. Each of the roller gears engages a respective one of the drive gears at all dispositions of the rollers. That is, since the rollers separate by swinging on the drive gear axes, the roller gears always remain engaged with a respective one of the drive gears.

Thus, one of the objects of this invention is to provide "lead screw tapping" for irregular shapes of workpieces.

An object of this invention is to provide a helical roller drive feed mechanism for a tapping machine which is dependable, rugged and of simple operation.

It is an object of this invention to provide for economy and simplicity in a tapping machine feed mechanism by utilizing a pair of drive rollers in combination with a pair of guide rail trackways.

Another object of ths invention is to provide a helical roller drive feed mechanism having a safety release for pressure relief upon reaching a predetermined pressure of the workpieces against the feed mechanism.

It is yet another object to provide a safety release for a tapping machine feed drive, which can be adjusted to any desired predetermined pressure of workpieces against the feed mechanism and which can be varied as to sensitivity.

Still another object is the provision of asynchronous drive for "lead screw tapping" allowing a safety release by separation of drive rollers, which, nevertheless, always remain in drive engagement.

It is also an object of this invention to provide a "lead screw tapping" feed drive mechanism which is economical to manufacture by utilizing a minimum of drive rollers, in conjunction with guide rail trackways, as well as other parts that lend themselves to standard mass-production manufacturing technique.

Further and other objects, and a more complete understanding of the invention may be had by referring to the following description and claims, taken in conjunction with the accompanying drawings.

DESCRIPTION OF THE DRAWINGS

For the purpose of illustrating the invention, there is shown in the drawings a form which is presently preferred, it being understood, however, that this invention is not necessarily limited to the precise arrangements and instrumentalities there shown.

FIG. 2 is a partial perspective view showing details of the invented feed mechanism;

FIG. 3 is an enlarged cross-section taken along the lines 3—3 of FIG. 1, showing detailed parts of the feed mechanism;

FIG. 4 is an enlarged cross-section, partially in phantom, of FIG. 1, taken along line 4—4, to show the drive mechanism for the present invention;

FIG. 5 is an enlarged partial elevational view taken in the direction indicated by the arrows 5—5 of FIG. 1, to show an outside corner of the feed mechanism;

FIG. 6 is the corner of FIG. 5 in an alternate position;

FIG. 7 is an unorthodox cross-section, taken in a direction always perpendicular to the line 7—7 of FIG. 4, to spread the drive mechanism at the rollers, thereby showing the intermeshed gears thereat.

FIG. 8 is an enlargement of the spread portions of FIG. 7.

DESCRIPTION OF THE PREFERRED EMBODIMENT

Figure 1:
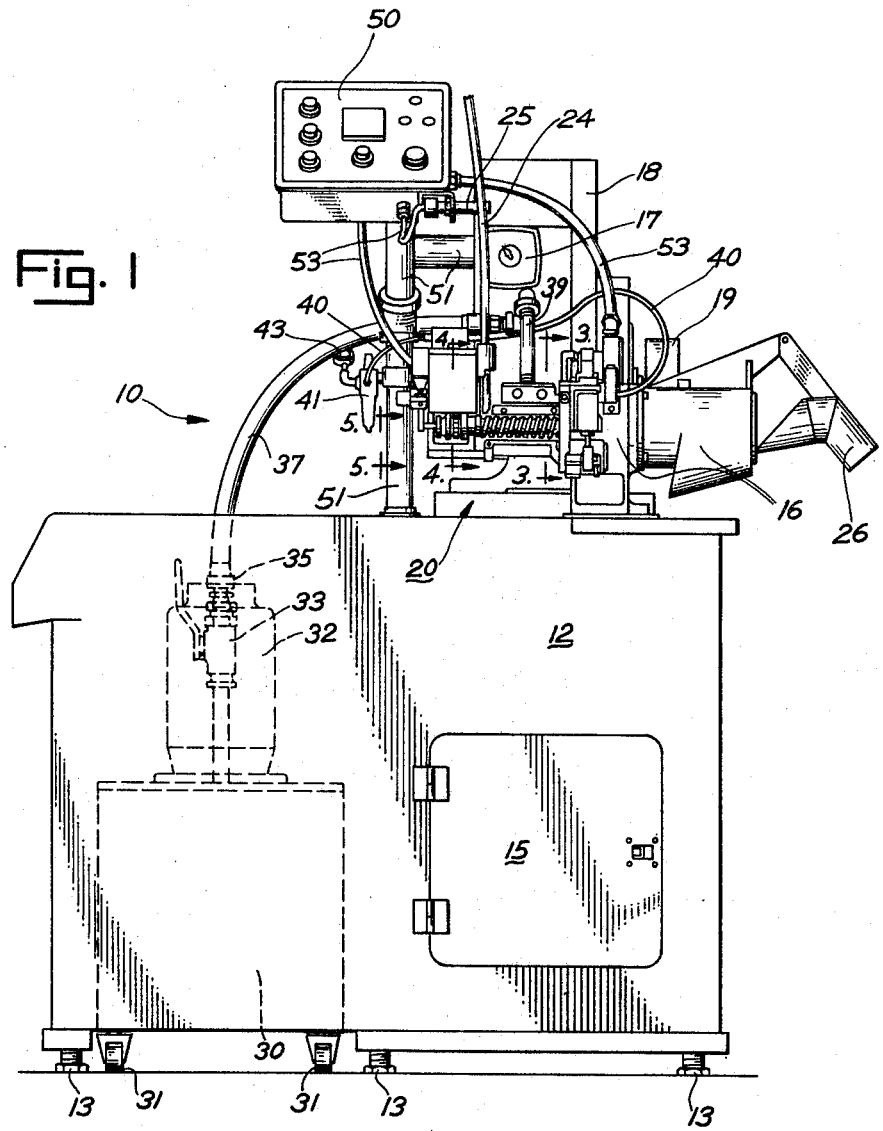
FIG. 1 is a front elevational view of a tapping machine having the feed mechanism of present invention.

Referring now to the drawings in detail, wherein like numerals indicate like elements, there is shown in FIG. 1, a tapping machine designated generally at 10. The machine 10 is a high speed "floating tap" type, similar to that of my co-invention, described in detail in the aforementioned Patent No. 3,233,259. A general description of the machine 10 as included here, only to afford a sufficient understanding of the invented feed mechanism therefor.

The machine 10 is supported upon an enclosed bench 12 resting on adjustable feet 13. A hinged and latched access door 15 provides storage within the enclosure of bench 12. A tap housing 16 and electric motor 18 are secured on the top of the bench 12, as shown. The motor 18 is coupled to a conventional variable speed pulley mechanism having an indicator 17, which may be set to drive a pulley belt 19 at a desired rate.

The numeral 20 indicates, only generally, those parts of machine 10 which are the feed mechanism of the present invention to be fully described in detail hereinafter, by reference to the remaining figures, specification and claims. Unfinished work piece blanks are dropped on feed mechanism 20 by gravity chute 24 from a source such as a bin (not shown). A proximity switch 25 senses absence of workpieces in chute 24 to turn off machine 10. An articulated discharge chute 26 is provided for the collection of finished workpieces.

Lubrication of the tapping operation is provided. A portable oil reservoir 30, shown resting on casters 31 within the bench 12, together with pump 32, are the source of lubrication fluid. The fluid is pumped upward past shut-off valve 33 and the universal disconnect 35, through flexible lubrication conduit 37 and rigid lubrication conduit 39 where the fluid is distributed to the workpieces and tap.

Pneumatic supply conduits 40 provide a source of pneumatic holding power for safety release devices of the feed mechanism 20. A conventional pneumatic pressure regulator 41, with an indicating dial 43, connects the pneumatic supply conduits 40 to a source of pneumatic pressure (not shown). It is understood that the pneumatic pressure in the conduits 40 may be set to any desired level by an ordinary adjustment of regulator 41.

A master control panel 50 is supported over the bench 12 by a support column 51, as illustrated. All electrical power to the motor 18, lubrication pump 32, and safety release devices, (which will be described hereinafter as part of the invented feed mechanism 20) is controlled at the control panel 50. That is, through various electrical conduit lines 53 (those for the motor 18 and pump 32 passing through the hollow interior of support column 51).

Details of the drive for the machine 10 and feed mechanism 20 are shown in the cross-section of FIG. 7. The tap 60 of the machine 10, is a "floating tap" having a crank shaped stem (not visible) within a cylindrical drive casing 61. As is commonly known in this art, rotation of the cylindrical drive casing 61 causes the tap 60 to rotate along with it. As shown, the cylindrical drive casing 61 is journaled for rotation in the heavy, durable casting of tap housing 16 on bearings 62, 63. A removable face plate 64 held on to the housing 16 by machine screws 65, is provided for access to the interior of casing 16. A retaining ring 66, clamped in place between the face plate 64 and casing 16, in a groove around bearing 63, prevents axial movement of the bearing 63 and cylindrical drive casing 61. The tap housing 16 extends outward at one side of the cylindrical drive casing 61 to house a drive mechanism therefor. At the front of housing 16, is a feed housing 70 fastened by bolts 72. The feed housing 70 is a hollow L-shaped casting of a suitable, durable metal having a short outward leg 71 and a longer leg 73 extending parallel to housing 16, as shown in FIG. 7. The feed housing 70 contains and support drive means of the invented feed mechanism 20.

Opposed drive rollers 80, 82 are journaled on the machine 10 at parallel dispositions spaced radically and extended axially outward with respect to the tap 60. With reference to FIG. 7, it is noted that the rollers 80, 82 extend along the cutting portion of tap 60 and are supported at ends opposite the tap 60 in the leg 73 of feed housing 70. Helical feed pathways 81, 83, which may be grooves of appropriate cross-sectional shape, run continuously from end to end of the rollers 80, 82. The helical feed pathways 81, 83 have opposite inclinations. Thus, rotation of roller 80 in a clockwise direction, while roller 82 is rotated in a counterclockwise direction, will move workpieces 75 (pierce-nuts) toward the tap 60. It is understood that the helical feed pathways 81, 83 should be in phase in order to present the workpieces 75 perpendicularly to the tap 60. That is, the beginning and end of each feed pathway should be opposed to its counterpart, once during each revolution of the rollers 80, 82. To assure proper phase alignment of each of the rollers 80, 82, a projecting key 85 (visible in FIG. 8 only for roller 82) is provided at the outer end of each roller. The key 85 of each roller fits within an accommodating notch in a gear bushing 86, thereby locking the rotational disposition of each roller's feed pathway with respect to a respective gear bushing 86. A flanged extension bushing 87 extends within each gear bushing 86 and a short distance into the end of a respective roller 80, 82 to a concentric bore provided therefor. Note in the detail of FIG. 8 that a smaller diameter and threaded concentric bore 88 is also provided in each roller 80, 82. The assembly of rollers 80, 82, gear bushings 86, and extension bushings 87, is fastened together by a threaded spindle 89 passing through each extension bushing 87 and engaged in the threaded bore 88, as shown. That is, the head of spindle 89 bears against the flange of extension bushing 87 at one end while the threaded end of spindle 89 engages within bore 88 to hold the opposite end of extension bushing 87 in the bore provided in each of the respective rollers 80, 82. In this manner, the gear bushings 86 are clamped therebetween against the ends of the rollers 80, 82. As indicated above, the key 85 in notched gear bushing 86 locks a respective roller and gear bushing for rotation together. A thrust bearing ring 84, surrounding key 85 and gear bushing 86, as shown, is provided for each roller 80, 82, to transmit all axial pressures.

Each roller 80, 82 is journaled on a lever 90, 92, respectively. As shown in FIGS 7 and 8, each lever 90, 92 is of two segments joined together by a connector bushing 93. The levers 90, 92 receive journal bushings 95 which have minimal friction at interior surfaces. The gear bushings 86 are journaled for rotation within the journal bushings 95 on the interior surfaces, as shown. Thrust washers 97 are provided between the ends of stationary and rotating parts. For example, the journal bushings 95, levers 90, 92, are separated by thrust washers 97 from the flanges of extension bushings 87 and bearing rings 84. In this manner, the rollers 80, 82 and their respective gear bushings 86 are free to rotate together in the levers 90, 92.

In turn, each of the levers 90, 92 is journaled within the leg 73 of feed housing 70, in order to allow the rollers 80, 82 to swing radially outward from tap 60. Notice that an axle 100, 102, is provided for each lever 90, 92, by passing through the respective connector bushing 93 thereof. The axles 100, 102 extend outward from the levers 90, 92, for journaling in opposite walls of the leg 73 of feed housing 70. Spacer bushings 103, held by retainer rings 104 in grooves provided in the axle 100, integrally connect together the lever 90, connector bushing 93, and axle 100. A pivot bushing 105 in each wall of leg 73, receives each of the spacer bushings 103, as shown. The engaging surfaces of the spacer bushings 103 and pivot bushings 105 are of minimal friction. It is thus understood, that the lever 90 is free to pivot on the axle 100. Furthermore, axle 100 and associated spacer bushings 103 can slide axially with respect to pivot bushings 105. Thus, the roller 80 and respective lever 90 may also move axially a short distance limited by the confines within the walls of leg 73.

Axle 102, is somewhat longer and has one spacer bushing 103 held in place by retainer ring 104 at one end. A flanged spacer bushing 107 is provided on axle 102 at the opposite side of lever 92. Both the bushings 103, 107 are journaled in pivot bushings 105 in an identical manner described for axle 100. Thus, the roller 82 and respective lever 92 are free to pivot on axle 102 and also move axially a limited distance between the confines of opposite walls of the leg 73, as described above for their counterparts.

A portion of axle 102 extends through the flanged spacer bushing 107 and into a coil spring retainer cup 110 fastened to the leg 73, by machine screws 112, or the like (shown in FIGS. 5 and 6). Within the retainer cup 110 are a coil spring 111 and two pusher rings 113, 114. Pusher ring 114 is retained at the end of axle 102 by means of a retainer ring 115 in a groove provided thereat. The coil spring 111 acts to bias the pusher rings 113, 114, apart, the pusher ring 114 acting against retainer cup 110, and the pusher ring 113 acting against the flanged spacer bushing 107, respectively. The axle 102 is free to slide axially with respect to the pusher ring 114 and outward through an opening provided in the retainer cup 110. This movement of axle 100 will bring pusher rings 113, 114 together. Thus, axial movement of the roller 82, lever 92, and shaft 102, in an outward direction with respect to tap 60, will always be against the bias of spring 111. In other words, the axial bias of spring 111 is inward, toward the tap 60, forcing the pusher 113 against flanged spacer bushing 107, to push lever 92 and the roller 82 towards the tap 60. The flanges of spacer 107 provide a stop bearing against a wall of housing 70 to limited the inward axial movement.

An engaging means is provided on each of the levers 100, 102, in order to maintain a symmetrical spacing of tap 60 between rollers 80, 82 as they swing radially apart and outward therefrom. This has been provided by the intermeshed gear segments 120, 122 which are concentric with the axles 100, 102, and fixed against the levers 90, 92, respectively. Each gear segment 120, 122 includes a back-up plate 121, 123, which are segments of circles also concentric with the respective axles 100, 102. The unorthodox spread view of FIGS. 7 and 8 shows the gear segments 120, 122 and back-up plates 121, 123, spread apart, while in actuality these parts are always intermeshed, as may be best visualized by reference to FIG. 6. That is, the gear segments 120, 122 remain intermeshed as the levers 90, 92 pivot on axles 100, 102 to separate the rollers 80, 82 radially apart. Engagement between gear segments 120, 122 insures that the spacing of rollers 80, 82, is always symmetrical with respect to the tap 60, even when both are released outward therefrom. The back-up plates 121, 123 are circular segments of unequal diameter. That is, back-up plate 121 has a greater diameter than its respective gear segment 120, while the back-up plate 123 has a diameter smaller than its respective gear segment 122, as may be seen best with reference to FIG. 8. Thus, as shown in FIG. 6, the back-up plate 121 has a circular edge which extends behind the teeth of both gear segments 120, 122 into a rolling engagement with a smaller curved surface of the back-up plate 123. All outward axial movement of the roller 80 and lever 90 are transmitted through the back-up plate 121 and gear segment 122 to the lever 92 and against the bias of spring 111. Therefore, it is understood that both the rollers 80, 82 are biased axially toward tap 60 by means of the spring 111, in the manner described above.

A stop plate 125 has an opening fitting on an outward projecting collar of lever 90, as may be seen with reference to FIG. 8. The opening is large enough to allow the flanged end of extension bushing 87 to freely revolve therein. The stop plate 125 also has a circular-shaped surface 126 which abuts against a corresponding collar extending from the lever 92, as shown in FIG. 5. In this manner, the operational spacing of the roller dispositions is determined, since the stop-plate 125 prevents the rollers from moving closer together. If desired, the stop-plate 125 may be interchangeable for different sizes of workpieces.

Positioning means are provided to releasably hold the rollers 80, 82 at the spaced dispositions determined by the stop plate 125. For this purpose, a pneumatic jack 130 has been found to be satisfactory, since it is compressible to allow slight outward radial play of the roller dispositions as a predetermined pressure is approached. The pneumatic jack 130 is of the type having a single-acting plunger 131 acting on a connecting rod 132. As shown in FIG. 6, the connecting rod 132 is threadedly engaged to a traveler 133. Engagement between the rod 132 and traveler 133 may be locked by means of a set screw, or the like. The traveler 133 is confined within a protective housing 134 for guided reciprocal motion directly above the lever 90. A removable end plate 135, held by a fastener such as machine screw 136, provides access to the interior of the protective housing 134. The traveler 133 is slotted at 137 and the floor of the protective housing 134 (a part of leg 73) is slotted at 138 to accommodate an extension 140 of the lever 90. At the end of extension 140, is an inclined slot 142. The traveler 133 and lever 90 are connected together by means of the transverse pin 145 which passes through traveler 133 and within the slot 142. Thus, whenever the rollers 80, 82 are released from their dispositions they will swing apart on levers 90, 92 in the directions of the arrows in FIG. 6. Extension 140 of lever 90 will move transverse pin 145 and the traveler 133 in the direction indicated. On the other hand, when pneumatic pressure is admitted to the pneumatic jack 130, plunger 131 will force connector rod 132 against the traveler 133 moving it in an opposite direction. This will cause the transverse pin 145 to move outwardly against inclined slot 142, causing the lever 90 to pivot about axle 100. The intermeshed gear segments 120, 122 will transmit a co-pivoting motion between the levers 90, 92, causing the rollers 80, 82 to move together symmetrically about the tap 60. As long as pneumatic pressure remains in the pneumatic jack 130 the rollers 80, 82 will be held together at spaced dispositions determined by the stop plate 125. However, the pneumatic holding pressure within jack 130 is, of course, additionally compressible, allowing a slight radial outward play of the rollers 80, 82. Also, the rollers 80, 82 have an outward axial play against the bias of spring 111. The opposing pressure necessary to cause play, of course, depends upon the pneumatic holding pressure and the strength of spring 111, which may be adequately chosen for a particular application. For example, the regulator 41 may be set to a particular holding pressure.

A trip means is provided to sense the radial and axial play of the rollers 80, 82 at pre-set outward limits. When the limits are exceeded the trip means acts to release the holding pressure in the pneumatic jack 130, thereby allowing the rollers 80, 82 to spring radially apart. The trip means includes a solenoid operated valve 150, which opens and closes the cylinder of the pneumatic jack 130 to the atmosphere, as schematically indicated in FIG. 5. The solenoid control valve 150, in turn, controlled by a micro-switch 152 through the conduit 53. The switch 152 has open and closed positions and includes a pressure button 153 which is spring biased outwardly to one of the positions. Normally, the button 153 is held inward against the spring bias at an alternate position. Releasing the button 153 outward will alternate the position of the switch to change the status of the solenoid valve by either opening or closing an electric circuit through the conduit 53. In this manner, the solenoid valve 150 releases the holding pressure from the pneumatic jack 130, allowing the rollers 80, 82 to separate radially apart.

The trip means also includes a pivoted contact 155 and the link member 160. The contact 155 pivots about a pin 156 and has an extending arm 157 carrying the variable set screw contact 158 for engagement with the pressure button 153 of switch 152. A hemispheric surface 159 projects from the contact 155, as shown. The link member 160 is an L-shaped member pivoted at one end on the axle 100. A retaining ring 161 in a groove at the end of axle 100 prevents the link member from slipping axially outward, off the axle 100. The opposite end of link member 160 is pivoted by pin 165 to the stop plate 125. (The retaining ring 161, acting through link 160 and pin 165, also retains stop plate 125 on the lever 90.) The link member 160 has a cammed surface 168 bearing against the hemispheric surface 159 of the pivoted contact 155. Thus, it is understood that a radial outward movement of the rollers 80, 82 on levers 90, 92 causes a corresponding movement of the link member 160 and its cammed surface 168. Movement of the cammed surface 168 with respect to the hemispheric contact 159 allows the pivoted contact 155 to swing with respect to the pressure button 153 of switch 152. In this manner, the pressure button 153 is released outwardly in accordance with its spring bias to an alternate open or closed position. Thus, it is easily seen that radial outward play of the rollers 80, 82 beyond pre-set limits will trip the switch 152, releasing pneumatic jack 130 and allowing the rollers to swing radially apart to a safety release disposition. Since set screw 158 contacts button 153, it may be varied to set the outer limits of play, and in this manner vary the sensitivity of the trip mechanism. Furthermore, with reference to FIG. 8, it is noted that the cammed surface 168 of the link member 160 is also prevalent in a transverse direction. Since the contact surface 159 is hemispheric, it is readily understandable that an axial movement outward or inward of the link member 160 will also trip the switch 152. That is, when an axial component of pressure between the workpieces and rollers builds up sufficiently to overcome the bias of spring 111, the rollers 80, 82, levers 90, 92, and the link member 160, will move axially outward. Again, the transverse cross-section of the cammed surface 168 will move with respect to the hemispheric contact surface 159 allowing the pivoted contact 155 to move with respect to the pressure button 153 to alternate the switch 152.

The rollers 80, 82 must be driven with opposite rotation and at a speed synchronized with that of the tap 60. Drive means are provided for this purpose by a gear train within the tap housing 16 and the feed housing 70. The same source of rotational power is used to drive both the tap 60 and rollers 80, 82. That is, electric motor 18 acting through a conventional variable speed pulley mechanism, (part of which is shown at the numeral 170 on FIG. 7) drives the pulley belt 19 at a desired rate. The belt 19 rotates a drive pulley 172 keyed to a drive shaft 173 by the machine screw arrangement 174. The drive shaft 173 is journaled for rotation in the tap housing 16 on the bearings 174, 175. Removable retainer plates 176 are affixed on tap housing 16 by machine screws 177 to retain the bearings 174, 175 in position, yet allowing accessibility for the removal and replacement thereof. Within tap housing 16, a drive sprocket 180 is keyed to the drive shaft 173 for rotation thereby. The drive sprocket 180 engages a chain 185 to drive a sprocket 186 on the cylindrical tap housing 61. In this manner, it is understood that rotational drive at a desired rate is provided for the tap 60.

A removable cover 190 is provided at one side of tap housing 16 for access to the chain drive and various gears therein. An access opening 191 is also provided at an inward position on tap housing 16, as shown. The removable cover is sealed by gasket 192 and held in place by machine screws 193. Leakage of lubrication oil is prevented by various resilient O-rings 195 which provide fluid tight seals between housing 16 and other parts connected thereto. A more elaborate seal is provided for the rotating cylindrical drive casing 61 by the slip-ring arrangement shown at 197.

The shaft 173 also has a drive gear 200 integrally formed therewith. Drive gear 200 is meshed with a gear 202 to rotate extension shaft 205. Extension shaft 205 is journaled on bearing 206 to extend from the interior of casing 16 into the interior of leg 71 of hollow feed housing 70. Bearing 206 is mounted in an opening through front wall of housing 16 by means of the carrier ring 207, and kept thereon by retaining ring 208. Safety clutch 210 connects the extension shaft 205 to a continuation shaft 211. The continuation shaft 211 is journaled within the leg 71 of the housing 70 for rotation on bearings 212, 213. The bearings are separated apart by spacer 215 and are held in position, as shown, by retaining rings 216, 217. The end of continuation shaft 211 extends within leg 73 and terminates at the drive gear 220. Access to gear 220 is afforded through the opening provided by removal of the screw 211 and cover 222. Drive gear 220 is meshed with an intermediate gear 225 which has an axle bearing 226 journaled for rotation about the shaft 227. A spacer 224 on shaft 227 maintains the intermediate gear 225 at a proper interval from the inside wall of leg 73. Shaft 227 is retained in leg 73 by the facing plate 228 and screw 229, as shown. The intermediate gear 225 is meshed with a pair of (intermeshed) roller drive gears 230, 232. Reference is now made to the detail of FIG. 8, which shows that the drive rollers 230, 232 are journaled for rotation on bushsings 231, 233. Notice that bushings 231, 233 receive and rotate about the connector bushings 93 of the levers 90, 92, respectively. In other words, the drive gears 230, 232 are journaled for rotation about an axis concentric with the axles 100, 102, respectively. The drive roller 232 drives the drive roller 230; therefore, each is rotating in an opposite direction. Separate roller gears 240, 242 are integral parts of the gear bushings 86 of each roller 80, 82, respectively. Each roller gear 240, 242 is intermeshed with a respective one of the oppositely rotating drive gears 230, 232; thus each roller gear 240, 242 also rotates in an opposite direction with regard to each other.

The gear drive operation is best visualized with reference to FIG. 4. There rotation of the drive sprocket 180 turns the sprocket 186 along with tap drive casing 61 by means of the chain 185. The drive gear 200, on the same shaft 173 as sprocket 180, drives gear 202 which in turn rotates the drive gear 220 at the end of continuation shaft 211. The gear 220 in turn drives intermediate gear 225, thereby driving drive gear 232 and drive gear 230. The drive gears 230, 232 rotating in opposite directions also drive the roller gears 240, 242 with opposite rotations. It is to be noted that the roller gears 240, 242 separate apart, along with rollers 80, 82, by swinging about the axles 100, 102. It is clear that since the drive gears 230, 232 are journaled on the same axles 100, 102, the rollers 80, 82 and roller gears 240, 242 may separate apart without disengagement from drive engagement.

Attention is now directed to the stationary guide rails 250, 252 which hold workpieces 75 against the drive rollers 80, 82. Excellent visualization of this may be had by reference to the perspective view of FIG. 2 and the elevation of FIG. 3. A pair of opposed rail trackways are formed by the rails 250, 252. The trackways engage opposite elongated outside of workpieces 75 to hold them in place against rollers 80, 82 and within feed pathways 81, 83. The rails have a cross-sectional shape allowing them to fit closely along the rollers 80, 82, as best revealed in FIG. 3. Also note that rails 250, 252, of each respective trackway are spaced to engage workpieces 75 at separate points, thereby preventing rotation thereof along with tap 60. The rails are fixed on mounting bars 251, 253 by means of the hex-socket screws 255. As illustrated, mounting bars 251, 253 hold rails 250, 252 between rollers 80, 82, at opposed positions paralleling the tap 60 and rollers. Openings 256 (indicated by dashed lines in FIG. 3) are provided through the rails 250, 252 and mounting bars 251, 253 for the passage of metal chips produced during the threading operation. The mounting bar 251 has a longitudinal hollow bore closed by plug 257, which communicates with a threaded connecting opening 258 and sprinkler openings 259 (shown by dashed lines in FIG. 3). The rigid lubrication conduit 39 (shown in FIG. 1) is threadedly engaged within the connector opening 258 to supply lubrication fluid through the sprinkler openings 259 to the tap 60 and workpieces 75 (pierce nuts).

The rails 250, 252 are referred to as "stationary" because they do not rotate. However, the rails are releasably mounted, that is, the mountings thereof allow the rails to be released radially outward from tap 60. The mounting blocks 251, 253 are secured on a pair of upper arms 260, and lower arms 262, respectively, in a suitable manner or may be integral therewith. Both pairs of arms 260, 262 are journaled to pivot on support shaft 263. Spacers 261 on shaft 263 separate arms 260, 262 from each other and from the housings 16 and 70. With reference to FIG. 7, the support shaft 263 is mounted at one end by passing completely through the hollow tap casing 16. As shown, a liner sleeve 263 is provided between the shaft 263 and casing walls 16 in order to maintain the fluid-tight interior of the housing 16. The opposite end of shaft 263 is supported in leg 73, as illustrated by FIG. 2. The lower arms 262, have somewhat differing configurations. In order to rigidify them together, a hollow tubular brace 265 may be provided between the two lower arms 262 by welding, or the like. A splash guard 266 fastened at one end by screw 267 to the mounting block 251 may be provided, as indicated, between the upper arms 260 and lower arms 262.

An extension 270 is provided for one of the upper arms 260 and an extension 272 is provided for on one of the lower arms 262. Each extension has an inclined surface 271, 273, leading to a flat engaging surface. It is apparent that a degree of mechanical advantage is afforded over outward pressure of the workpieces 75 against the rails 250, 252 by the extra length leverage of extensions 270, 272.

A detent means, including the hook members 280, 282, is provided to keep the trackways of rails 250, 252 in position against workpieces 75. The upper hook member 280 is pivoted on lower hook member 282 by means of pivot pin 283. Lower hook member 282 is pivoted on the tap housing 16 by means of pivot rod 284. A cavity in one side of the hook member 280 presents guide surfaces 285, 286 for cooperation with a guide roller 287 journaled on the housing 16. A spring plunger 288 is provided to bias the upper hook member 280 inward with the guide surface 286 against the guide roller 287, as shown best in FIG. 3.

Pneumatic means, that is, a pneumatic ram 290, is provided to bias the hook members 280, 282 into keeping the rails 250, 252 at their respective positions, shown in the drawings. The pneumatic ram 290 has a single acting plunger 291 which acts on the connector rod 292. Connector rod 292 is pivotally connected at one end of the hook member 282 by the connecting pin 295. Pneumatic holding pressure in the pneumatic ram 290 will force the plunger 291 and connecting rod 292 down against the connecting pin 295. This causes the lower hook member 282 to pivot about pivot rod 284 and into upward engagement against the lower arm extension 272. This also causes a downward movement of pin 283 pulling the upper member 280 in a downward direction into engagement with the upper arm extension 270. Movement of the upper hook member 280 is mainly in a straight vertical direction, that is, despite the fact that the downward movement of pin 283 is arcuate, because it is biased with guide surface 286 against the guide roller 287. The guide surface 285 provides a downward stop, limiting downward movement of hook member 85 and plunger 291. Thus, within the limits of movement, the extensions 270, 272 are clamped in position, between the downward thrust of hook member 280 and the upward thrust of hook member 282, respectively. The pneumatic ram 290 keeps this position as long as pneumatic holding pressure is supplied.

A trip mechanism is provided to release the pneumatic holding pressure in the pneumatic ram 290. The trip mechanism includes a conventional solenoid operated control valve 300, which controls the admission and release of pneumatic pressure through the port 301. The solenoid control valve is energized through a switch 305 having alternate open and closed positions, which open or close an electrical circuit to activate or deactivate the solenoid operated control valve 300. That is, the switch 305 acts to make or break a circuit from a source of electrical power through the conduit 53 to the solenoid valve 300. The switch 305 has a pressure button 307 which is biased outward to one of the alternate positions. A pivoted contact member 310 is provided to swing about a pivot pin 311. The pivoted contact member 310 includes an arm extension 312 carrying a set screw contact 313 which is directly aligned to push against the pressure button 307.

A bias roller 315 is also journaled on the pivoted contact member 310, as shown. A spring plunger 317 bears against the biased roller to urge the pivoted contact member and its set screw contact 313 outward away from pressure button 307. The pivoted contact member 310 also includes a holding surface 318 which is inclined to the horizontal, as indicated. A bracket member 320 extends upward from the extension 272 of upper arm 260. The bracket member 320 extends upward above the holding surface 318 of the pivoted contact member 310, and also includes a right-angled projection arm 321 which extends directly over the holding surface 318. A variable set screw contact 325 is provided through the arm 321 at a position to abut the holding surface 318 of pivoted contact member 310. It is clear that set screw contact 325 may be set to vary the limits of contact between the bracket member 320 and to the contact member 310. It is equally clear, that the bracket member 320 with its set screw 325 bears against the holding surface 318 to keep the pivoted contact member with its set screw contact 313 bearing against the pressure button 307. Naturally, an upward movement of the extension 270, separating the rails 250, 252, will move the bracket member 320 upward and set screw contact 325 upward away from the holding surface 318 of the pivoted contact member 310. This will release the pivoted contact member 310 to swing outward away from pressure button 307, in accordance with the bias of spring plunger 317. In turn, this releases the pressure button 307 to be spring biased outward to an alternate position activating the solenoid valve 300, which releases holding pressure in the pneumatic ram 290. The detent hook members 280, 282 are tripped, allowing them to separate and release the extensions 270, 272. Thus, in this manner, a safety release for the rails 250, 252 is accomplished.

When the arm members 260, 262 are swung back to reposition the rails 250, 252 against the workpieces 75, it is desirable to provide a temporary means to hold the lower arms 262 until the lower hook member 282 swings back into clamping engagement under the extension 272. (On the other hand, the upper arms 260 will rest by gravity over the workpieces 75.) For this purpose, a detent stop 330 is provided to limit the upward swing of the lower arms 262. A short distance below the detent stop 330 is provided a spring biased catch 335 which projects outward from the tap housing 16 into the way of the extension 272 as it is swung upward. Catch 235 has an inclined under surface causing it to be depressed by the extension 272 as it passes upward. After the extension passes by, the catch 335 then projects outward to prevent a downward return of extension 272. However, upon re-engagement of the lower hook member 282, it pivots upward around rod 284 and also against the inclined under surface of catch 335 to depress it. Thus, the lower extension 272 may again be dropped downward upon release of the lower hook member 282.

The operation of the machine 10 is started by turning on an appropriate switch on at control panel 50. Workpieces 75 will be fed by the gravity chute 24 on to the rollers 80, 82. The bottom workpiece 75 in the chute 24 will rest upon the rotating rollers until the beginning of both feed pathways 81, 83 are presented together immediately below it. Then the bottom workpiece 75 is free to drop into the feed pathways 81, 83. The next workpiece 75, of course, cannot enter the feed pathways 81, 83, at the same time; thus, it is deposited on the rotating rollers 80, 82 to await the next presentation of the beginning of the feed passageways 81, 83. In this manner, as long as there are workpieces 75 in the gravity chute 24, the workpieces 75 are spaced apart and fed one by one along rollers 80, 82 to the tap 60. The rails 250, 252 bear against opposite long sides of the elongated workpieces 75, as best shown by FIG. 3. In this manner the workpieces 75 are held in the feed pathways 81, 83 and are prevented from rotating along with the tap 60. Thus a "lead screw tapping" is provided for the elongated ("piece-nuts") workpieces 75.

Naturally, as the workpieces 75 are fed along the feed means 20 to the tap 60, there is pressure between the workpieces 75, tap 60, rollers 80, 82, and rails 250, 252. Pneumatic holding pressure may be set by regulator 41 at a desired allowable limit of such pressure. Although only one regulator 41 is shown in FIG. 1, it is understood that individual regulators may be provided for each of the separate safety releases of the rollers and rails, respectively. Thus, one holding pressure may be set for the rollers, and a different holding pressure for the rails. On the other hand, the safety releases for both may be in the same system controlled by a single adjustable regulator 41. Then the unit holding pressure for the rollers 80, 82 and rails 250, 252 will, of course, be equal.

It is understood that the pneumatic rams 130, 290 for the rollers 80, 82 and the rails 250, 252, respectively, are compressible to a degree, depending upon the holding pressure. The compressibility provides for a slight amount of radial outward play of the rollers and rails. At lower holding pressures, it is apparent that the play will be greater in extent. The limits of such play are set by adjustment of the set screw contacts 158, 313 and 325. That is, the aforementioned set screws may be varied to different contact positions against the pressure buttons 153, 307, respectively; therefore, sensitivity of each trip mechanism is determined by the settings of the set screws. That is, if the set screws are positioned to move the pressure buttons 153, 307 to their inward extremes, it is evident that the relatively large movement of the pressure buttons outward is required before they are at an alternate position to trip the respective holding mechanisms. On the other hand, the set screws may be positioned so that the pressure buttons are on the verge of an alternate position, that is, only a very slight movement being necessary to trip the switches. From the manner above described, it is understood that the predetermined pressure of the workpieces against the rollers and rails sufficient to trip the various safety releases, is determined by setting the regulator 41 at a particular pneumatic holding pressure. Furthermore, the sensitivity of the safety mechanisms can be varied, as desired. In fact, the sensitivity may be set as to ignore certain momentary and slight excesses of pressure.

Upon an extreme pressure, beyond the predetermined pressure set as described above, that is, by an oversize workpiece 75 or a dull or broken tap 60, the safety releases are tripped, allowing the rollers 80, 82 and rails 250, 252 to separate. This prevents damage to the feed mechanism 20. Axial pressure components against the rollers 80, 82 act against the bias of spring 111. Thus, the amount of such an axial component pressure is, of course, determined entirely by the strength of the spring 111. Normally, a fairly strong spring is chosen. Upon reaching an axial component of pressure which overcomes the bias of spring 111, the rollers will be released outward in identical manner, as described before. Again, damage to the rollers 80, 82 and feed pathways 81, 83 thereon is avoided.

After a safety release is tripped, the machine will be stopped automatically by conventional electrical relay controls (not shown) provided at panel 50. The defective workpiece 75 or tap 60 may then be safely removed. Then the rollers 80, 82 and rails 250, 252 may be swung back into position. The uppermost rails 250 will swing downward on arms 260 and remain in position over the rails. (The bias of release spring 266 may be chosen to hold them slightly above normal position.) As the lower rails 252 are swung upward into position, the extension 272 will swing by the catch 335 upward as far as the detent limit 330. Catch 335 will be depressed inward against spring bias by contact of the extension 275 against the under cammed surface. However, once past, the extension 272 will be locked in position as the catch 335 extends outward therebelow. The controls on the panel 50 are set to close the solenoid valves 150, 300, and pneumatic pressure again applied to the pneumatic rams 130, 290 to hold the rollers and rails in position. The hook members 280, 282 are then back into clamping engagement. The lower hook member 282 again depresses the catch 335, and holds it in a depressed position. Release of pneumatic holding pressure, of course, will allow the rollers 80, 82 and the rails 250, 252 to again separate radially. Extension 272, of course, may drop, since the catch 335 is depressed at the instant of release.

The present invention may be embodied in other specific forms without departing from the spirit of potential attributes thereof and, accordingly, reference should be made to the appended claims, rather than to the foregoing specification as indicating the scope of the invention.

I claim:

1. A continuous mechanism for feeding workpieces of rectangular shape to a tapping machine, comprising in combination: a drive roller having a helical feed pathway therealong, said roller journaled on said machine at a parallel disposition, spaced radially from, and extended axially outward with respect to the workpiece receiving end of a rotatably driven tap of said machine, said pathway leading along said roller to said tap; a stationary lineal guide rail; releasable means for mounting said rail on said machine to extend along said roller at a position to hold said workpieces in said pathway for travel therealong, said rail having portions bearing against outsides of said workpieces at spaced positions on side surfaces of said workpieces to prevent rotation thereof with said driven tap; trip means to release said rail from said position for movement away from said tap and roller upon a predetermined pressure of said workpieces against said rail; and means to rotate said roller and drive said workpieces along said pathway and rail to said tap.

2. A feed mechanism in accordance with claim 1, wherein said releasable means includes detent means keeping said rail at said position, said trip means to trigger and open said detent means upon the occurrence of said predetermined pressure.

3. A feed mechanism in accordance with claim 2, wherein said detent means includes pneumatic means biasing said detent means into a normal position keeping said rail at said position, said pneumatic means being compressible to allow a slight play in said position as said predetermined pressure is approached, said trip means sensing said play at a pre-set limit thereof to open said detent means.

4. A feed mechanism in accordance with claim 3, wherein said pneumatic means has adjustable regulator means to set pneumatic pressure and said trip means includes adjustable contact means to set said limit of said play, whereby said predetermined pressure of said workpieces against said rail may be selected by adjustment of said regulator and contact means.

5. A feed mechanism in accordance with claim 1, including: lever means upon which said roller is journaled, said lever means being pivoted on said machine to allow said roller to swing radially outward from said tap; positioning means releasably holding said roller at said disposition; and a second trip means to release said positioning means upon a predetermined pressure of said workpieces in said pathway against said roller.

6. A feed mechanism in accordance with claim 5, wherein said lever means has an axle means pivoted on said machine and axially slideable with respect thereto for a limited axial movement relative to said disposition, and including biasing means urging roller to said disposition axially toward said tap, said second trip means sensing said axial movement at a pre-set outward limit thereof to release said positioning means upon an axial pressure component of said work pieces in said pathway against said roller sufficient to overcome said biasing means.

7. A feed mechanism in accordance with claim 6, wherein said positioning means includes pneumatic means for releasably holding said roller at said disposition, said pneumatic means being compressible to allow a slight outward radial movement of said roller away from said disposition as said predetermined pressure is approached, said second trip means sensing said radial movement at a pre-set outward limit thereof to release said pneumatic means.

8. A feed mechanism in accordance with claim 7, wherein said pneumatic means has adjustable regulator means to set pneumatic pressure and said second trip means includes adjustable contact means to set said limit of said radial and axial movements, whereby said predetermined pressure of said work pieces in said pathway against said roller may be selected by adjustment of said regulator and contact means.

9. A feed mechanism in accordance with claim 8, wherein said releasable means include detent means keeping said rail at said position, the first-mentioned of said trip means to trigger and open said detent means upon said predetermined pressure, and said positioning means includes a first pneumatic means for releasably holding said roller at said disposition, and wherein said detent means includes a second pneumatic means biasing said detent means into keeping said rail at said position, said first and second pneumatic means being compressible to allow slight play of said position and disposition, respectively, as said predetermined pressure is approached, said disposition comprehending an outward radial play, and said first and second trip means sensing said slight play at pre-set limits thereof to trip and release said first pneumatic and detent means, respectively, thereby freeing both said roller and said rail from said predetermined pressure.

10. A feed mechanism in accordance with claim 9, wherein said first and second pneumatic means are in a common pneumatic system with a single adjustable regulator means to set pneumatic pressure and wherein said first and second trip means both include adjustable contact means to set limits of play of said position and said axial and radial play of said disposition, respectively, whereby said predetermined pressure of said work pieces in said pathway against said rail and roller may be selected by adjustment of said regulator and contact means.

11. A feed mechanism in accordance with claim 1, wherein said roller is one of a pair of spaced parallel rollers journaled on said machine at opposed dispositions, and wherein said rail is one of two spaced parallel rails mounted on said machine at opposed positions, with said tap spaced between said dispositions and positions.

12. A feed mechanism in accordance with claim 11, wherein said rollers are both drive rollers with helical feed pathways therealong leading to said tap, and wherein said rails are parts of two opposed guide trackways bearing against opposed side surfaces of said work pieces.

13. A feed mechanism in accordance with claim 12, wherein each of said trackways provide spaced bearing points against which said work pieces bear to precent rotation of said work pieces during their movement along said driven tap and rollers.

14. A feed mechanism in accordance with claim 12, wherein the axes of said tap and rollers are in a single horizontal plane and said trackways are spaced vertically above and below said tap.

15. A feed mechanism in accordance with claim 14, including: separate arm members for carrying said trackways, respectively, said arm members each being pivoted on said machine for movements about a mounting axis parallel to said tap, allowing said arm members to swing apart to release said trackways from said opposed positions; detent means for releasably holding said trackways at said positions until said trip means releases said detent means as a result of a predetermined pressure being exerted by said work pieces against said rails.

16. A feed mechanism in accordance with claim 15, wherein said arm members extend beyond said trackways to ends opposite said mounting axis, and wherein said detent means includes hook members pivoted on said machine and engageable with said ends to clamp said ends and their respective trackways at said positions, the extensions of said arms beyond the trackways affording a mechanical advantage in respect to pressure of said work pieces against said rails tending to force said trackways apart.

17. A feed mechanism in accordance with claim 6, including: a detent stop means limiting upward movement of the lowermost of said arms; and a spring biased catch projecting outward from said machine into the path of the extending end of said lowermost arm as the lowermost trackway is swung upward to a respective one of said positions, said catch having a cambered under surface allowing said extending end to depress said catch and pass upward, said catch while projecting outward to prevent a downward return of said extending end until said hook members clamp said extending ends of said arms, one of said hook members then bearing upward against said cambered under surface to depress said catch so that upon release of said detent means said lowermost trackway is free to swing downward, the uppermost of said arms and trackways bearing downward on said workpieces when at a respective of said positions.

18. A feed mechanism in accordance with claim 16, wherein said detent means also includes pneumatic means biasing said detent means to a position for holding said trackways at said positions, said pneumatic means being compressible to allow a slight movement apart of said positions as said predetermined pressure is approached, said trip means sensing said movement at a pre-set limit thereof to release said detent means, said pneumatic means having adjustable regulator means to set pneumatic pressure therein and said trip means including adjustable contact means to set said limit of said movement, whereby said pre-determined pressure may be selected by adjustment of said regulator and contact means.

19. A feed mechanism in accordance with claim 18, wherein said pneumatic means has a cylinder with a plunger traveling therein and a valve connecting said cylinder to a source of pneumatic pressure, said plunger being connected to one of said hook members, and wherein said trip means has a solenoid connected to operate said valve and a switch connecting said solenoid to an electric power source, said switch having open and closed positions to alternately energize and de-energize said solenoid to control pressure at said cylinder and operate said hook members to alternately clamp and release positions, said switch being spring biased to one of said positions, and said trip means including a pivoted contact placed on said machine for engagement between said switch and one of said arm members, said contact pivoting upon movement of said one of said arm members to alternate said positions of said switch.

20. A continuous feed mechanism for feeding workpieces of rectangular shape to a tapping machine having a power driven tap, comprising in combination: a pair of drive rollers having opposite helical feed pathways therealong, said rollers being journaled on said machine at opposed parallel dispositions relative to one another and the rotatable driven tap, spaced radially and extended axially from said tap of said machine, said pathways leading along both said rollers to said tap; a pair of stationary trackways mounted on said machine along said rollers at opposed positions therebetween to hold said workpieces in said pathways for travel therealong, said trackways bearing against opposite side surfaces of said workpieces, respectively, at spaced positions along the side surfaces of said workpieces to prevent rotation thereof by said tap; and synchronous means to rotate said rollers in opposite directions to drive said workpieces along said pathways and trackways to said tap at a speed corresponding to the speed of said workpieces along said tap.

21. A feed mechanism in accordance with claim 20, wherein the axes of rollers are in a single horizontal plane, one on each side of said tap, and said trackways are spaced vertically, one above and one below said tap.

22. A feed mechanism in accordance with claim 21 including: lever means on which said rollers are journaled, said lever means being pivoted on said machine to allow said rollers to swing apart and outward relative to said tap; positioning means releasably holding said lever means with both rollers at said dispositions; a first trip means to release said positioning means upon a predetermined pressure of said workpieces in said pathways against said rollers; separate arm members movably affixed to said machine to carry said trackways, respectively, said arm members pivoted on said machine about a mounting axis parallel to said tap allowing said arm members to pivot apart from one another to release said trackways from said opposed positions; detent means for releasably holding said trackways at said positions; and a second trip means to release said detent means upon the occurrence a predetermined pressure of said workpieces against said trackways.

23. A feed mechanism in accordance with claim 22, wherein said lever means have axle means pivoted on said machine and axially slideable with respect thereto for a limited axial movement thereof from said dispositions, and also have biasing means urging said lever means toward said dispositions and axially inward toward said tap, said first trip means sensing said axial movement at a pre-set outward limit thereof to release said positioning means upon an axial pressure component of said workpieces in said pathways against said rollers sufficient to overcome said biasing means, and wherein said positioning means include engaging means on said lever means to maintain a symmetrical spacing of said tap between said rollers while allowing said rollers to swing apart and outward from the tap, and stop means it limit inward swinging movement of said rollers to said spaced dispositions; and also wherein said arm members have extensions projecting beyond said trackways to ends opposite said mounting axis, and said detent means include hook members pivoted on said machine to clamp said ends to releasably hold said trackways at said positions, said extensions affording a mechanism advantage over pressure of said workpieces against said trackways tending to separate them.

24. A feed mechanism in accordance with claim 23, wherein said lever means are separate levers, one for each of said rollers, and said axle means are separate axles, one for each of said levers, and said engaging means are seprate intermeshed gear segments, each fixed on a respective one of said levers and concentric with a respective one of said axles, and wherein said synchronous means include a gear train driving said tap and said rollers.

25. A feed mechanism in accordance with claim 24, wherein said gear train includes two identical drive gears journaled on said axles, respectively, said drive gears intermeshed, one driving the other, and two separate roller gears concentric with and affixed to said rollers, respectively, said roller gears intermeshed with said drive gears, one to each, respectively, whereby said rollers can be radially separated apart while continually driven in opposite directions of rotation.

26. A feed mechanism in accordance with claim 25, wherein said positioning means also includes a first pneumatic means for releasably holding said rollers at said dispositions, and wherein said detent means also includes a second pneumatic means biasing said hook members to clamp said ends of said arms with said pathways at said positions, said first and second pneumatic means being compressible to allow a slight radial outward movement of said dispositions and positions, respectively, as said predetermined pressure is approached, and said first and second trip means sensing said radial outward movement at pre-set limits thereof to release said rollers and trackways.

27. A feed mechanism in accordance with claim 26, wherein said first and second pneumatic means are in a common pneumatic system with a single adjustable regulator means to set pneumatic pressure and wherein said first and second trip means both include adjustable contact means to set limits of play of said positions and said axial and radial movement of said dispositions, respectively, whereby said predetermined pressure of said workpieces in said pathways against said rollers and trackways may be selected by adjustment of said regulator and contact means.

References Cited
UNITED STATES PATENTS

| | | | |
|---|---|---|---|
| 813,559 | 2/1906 | Koester | 10—139 |
| 1,551,715 | 10/1925 | McCain | 10—133 |
| 1,806,707 | 5/1931 | Raymond | 10—129 |
| 2,180,536 | 11/1939 | McLaughlin | 10—139 |
| 2,230,845 | 2/1941 | Oakey | 10—166 |
| 3,233,259 | 2/1966 | MacClean et al. | 10—139 |

CHARLES W. LANHAM, Primary Examiner

E. M. COMBS, Assistant Examiner

U.S. Cl. X.R.

10—169

PO-1050
(5/69)

UNITED STATES PATENT OFFICE
CERTIFICATE OF CORRECTION

Patent No. 3,492,682          Dated February 3, 1970

Inventor(s) Yvan A. Couillais

It is certified that error appears in the above-identified patent and that said Letters Patent are hereby corrected as shown below:

Column 2, line 19, "rai ltrackways" should be -- rail trackways-
Column 4, line 44, "support" should be -- supports -- .
Column 6, line 8, "limited" should be -- limit --.
Column 7, line 36 after "150" and before the comma insert -- is
Column 9, line 40, "outside" should be -- outsides --.

Column 14, line 57 (claim 13) "precent" should be -- prevent --
Column 16, line 39 (claim 23) "it" should be -- to -- .
Column 16, line 46 (claim 23) "mechanism" should be -- mechanics
Column 18, line 4, "1,551,715" should be -- 1,557,715 -- .

SIGNED AND
SEALED
JUL 7 1970

(SEAL)
Attest:

Edward M. Fletcher, Jr.
Attesting Officer

WILLIAM E. SCHUYLER, JR.
Commissioner of Patents